United States Patent
Kawanishi

(10) Patent No.: US 7,746,898 B2
(45) Date of Patent: Jun. 29, 2010

(54) BAND ALLOCATION METHOD, COMMUNICATION CONTROL UNIT AND COMMUNICATION APPARATUS

(75) Inventor: Suehiro Kawanishi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 988 days.

(21) Appl. No.: 11/444,297

(22) Filed: Jun. 1, 2006

(65) Prior Publication Data

US 2007/0183450 A1  Aug. 9, 2007

(30) Foreign Application Priority Data

Feb. 8, 2006  (JP) .............................. 2006-031596

(51) Int. Cl.
*H04J 3/16* (2006.01)
*H04J 3/22* (2006.01)
*G06F 15/173* (2006.01)

(52) U.S. Cl. ......................... 370/468; 703/223; 703/226

(58) Field of Classification Search ................. 370/252, 370/468; 709/223, 226
See application file for complete search history.

(56) References Cited

U.S. PATENT DOCUMENTS

| | | | | |
|---|---|---|---|---|
| 6,031,845 | A * | 2/2000 | Walding | 370/468 |
| 6,295,516 | B1 * | 9/2001 | Takeyasu | 703/13 |
| 6,434,117 | B1 * | 8/2002 | Momona | 370/236 |
| 6,721,831 | B1 * | 4/2004 | Lee | 710/105 |
| 6,738,816 | B1 * | 5/2004 | Momona | 709/226 |
| 6,775,020 | B2 * | 8/2004 | Fukunaga et al. | 358/1.15 |
| 7,489,697 | B2 * | 2/2009 | Choi et al. | 370/401 |
| 2003/0078063 | A1 * | 4/2003 | Legallais et al. | 455/509 |

FOREIGN PATENT DOCUMENTS

| | | |
|---|---|---|
| JP | 2003-078527 | 3/2003 |
| JP | 2003-204339 | 7/2003 |
| JP | 2004-241885 | 8/2004 |
| JP | 2005-012260 | 1/2005 |

* cited by examiner

*Primary Examiner*—Chi H Pham
*Assistant Examiner*—Farah Faroul
(74) *Attorney, Agent, or Firm*—Staas & Halsey LLP

(57) ABSTRACT

A band allocation method in a communication system in which nodes and a managing apparatus are coupled via a network and each node requests a transfer band with respect to the managing apparatus is provided. The method includes sending tolerable values of a transfer rate and a compression rate sent from each node to the managing apparatus at a time of a resetting, and a transfer rate and a compression rate that are to be actually used are sent from each node to the managing apparatus when making a request for a transfer band after the resetting. The includes detecting a node that cannot secure the transfer band and calculates a lacking bandwidth with respect to the request for the transfer band, and detects a node that can reduce a transfer band thereof and specifies a transfer rate and a compression rate with respect to the node that can reduce the transfer band thereof. The transfer band, the transfer rate and the compression rate are specified as requested by the request for the transfer band with respect to the node that cannot secure the transfer band.

8 Claims, 6 Drawing Sheets

FIG.2

| 10 | phy_ID | 0 | L | gap_cnt | sp | rsv | c | pwr | p0 | p1 | p2 | i | m |
|---|---|---|---|---|---|---|---|---|---|---|---|---|---|
| logical inverse of first quadlet |||||||||||||| sp (PHY_SPEED)
00 : S100
01 : S100 and S200
10 : S100, S200 and S400
11 : reserved rsv (reserved) → Compression rate
00 : 1/1
01 : 1/2
10 : 1/4
11 : reserved

FIG.3 definition

| reserved | bw_remaining |
|---|---|
| 19 | 13 | initial values

| zeros | 4915 |
|---|---| read values

| zeros | last successful lock |
|---|---| lock effects

| ignored | conditionally written |
|---|---|

FIG.5

| reserved | sp | cr | Bandwidth | sp (use_Speed)
00 : S100
01 : S100 and S200
10 : S100, S200 and S400
11 : reserved rcr (use_Compression rate)
00 : 1/1
01 : 1/2
10 : 1/4
11 : reservedrved

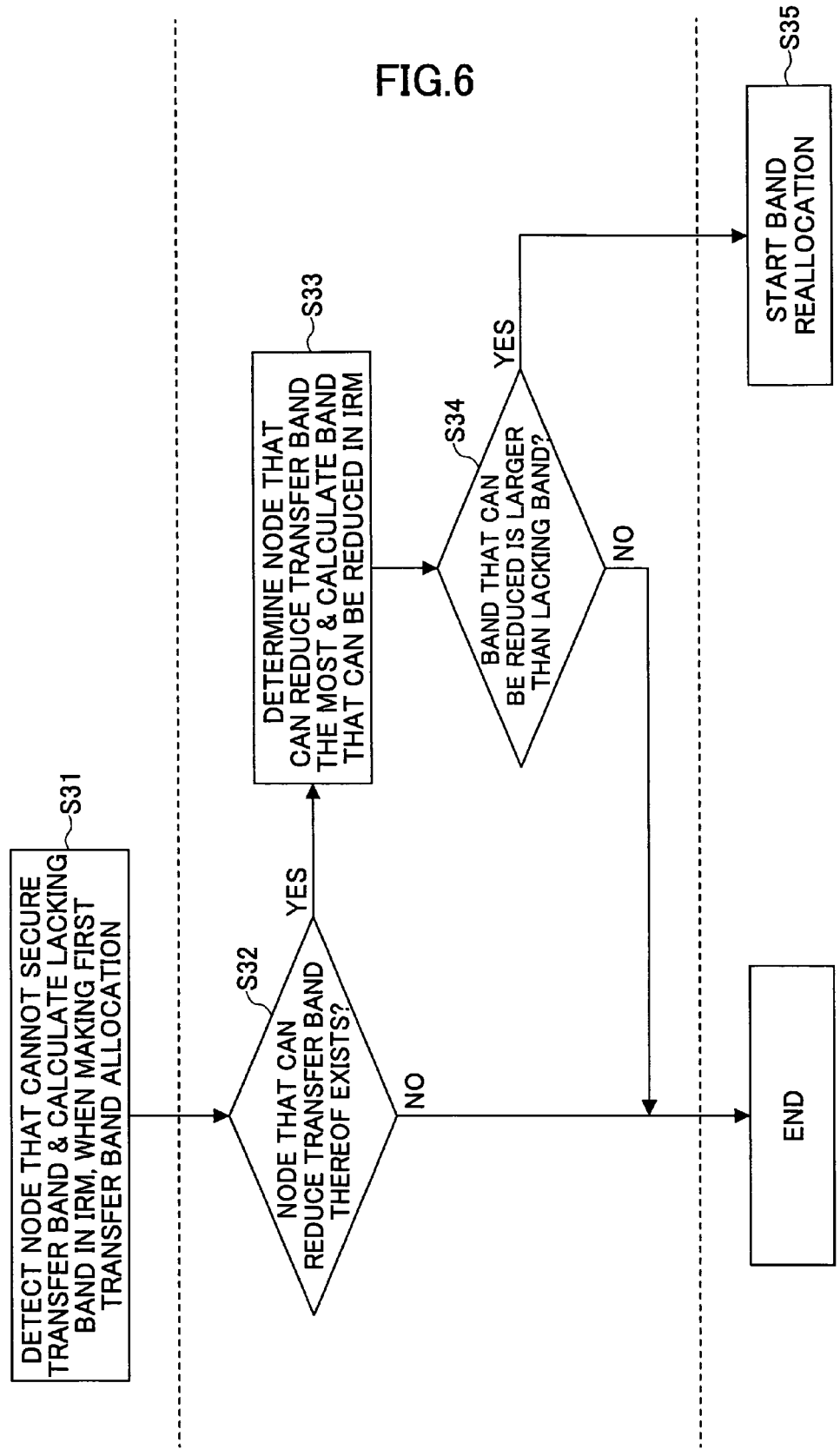

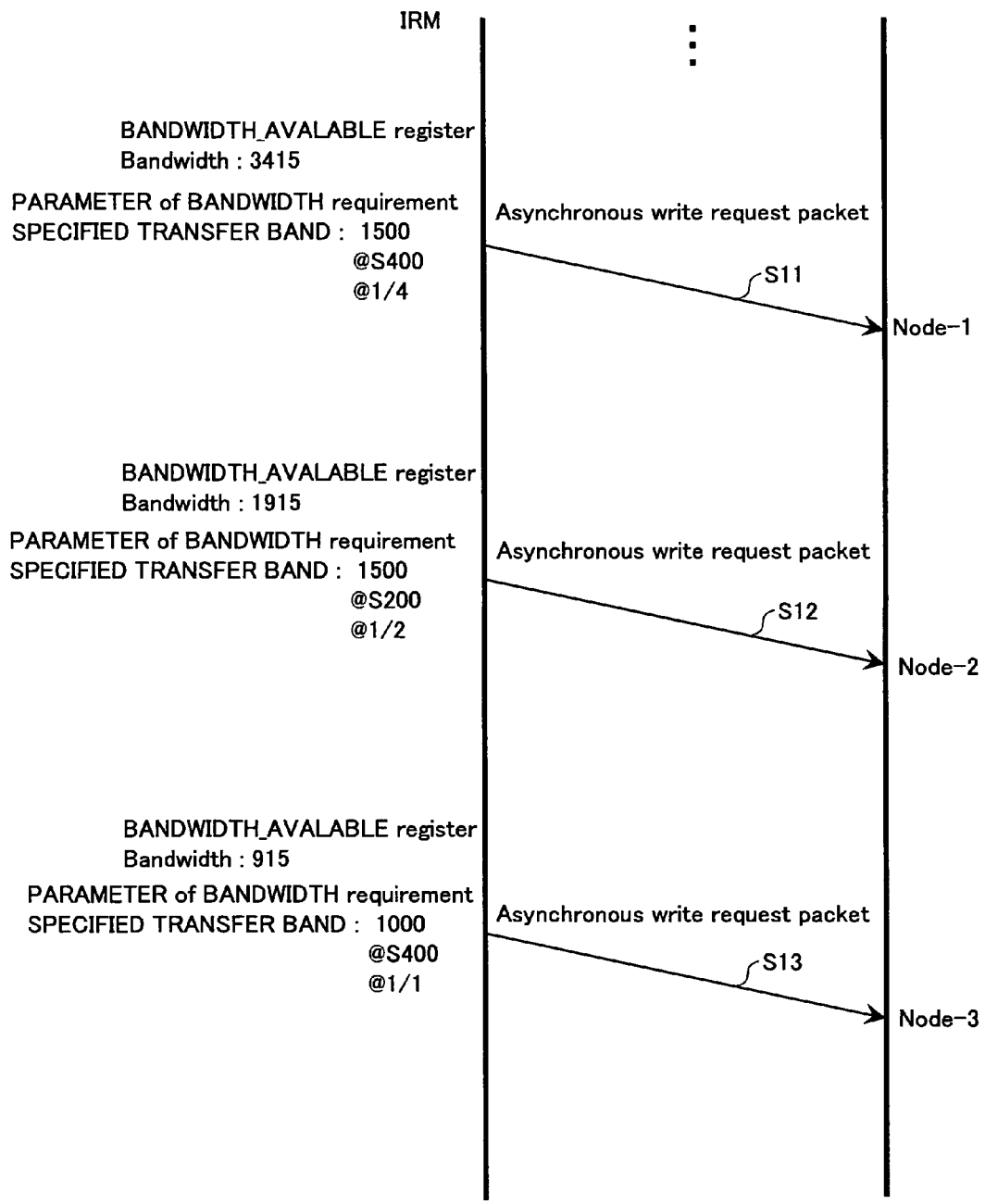

BAND ALLOCATION METHOD, COMMUNICATION CONTROL UNIT AND COMMUNICATION APPARATUS

BACKGROUND OF THE INVENTION

1. Field of the Invention

The present invention generally relates to band allocation methods, communication control units and communication apparatuses, and more particularly to a band allocation method and a communication control unit capable of reallocating bands with respect to a communication apparatus that is connected using a bus system, such as a high-speed serial bus in conformance with the IEEE1394 communication standard, which can be connected to an information processing apparatus such as a personal computer, a peripheral equipment thereof and an Audio Visual (AV) equipment, and to a communication apparatus which employs such a band allocation method.

2. Description of the Related Art

The band usable in an isochronous communication in conformance with the IEEE1394 communication standard is acquired by each node by requesting the band to an Isochronous Resource Manager (IRM). Each node can acquire the transfer band in the order in which the requests are made.

An information transfer system, a network apparatus, a data transmission control method and a communication resource managing method in conformance with the IEEE1394 communication standard have been proposed in Japanese Laid-Open Patent Applications No. 2004-241885, No. 2003-78527, No. 2005-12260 and No. 2003-204339.

In the case of the isochronous communication in conformance with the IEEE1394 communication standard, the band acquired by each node cannot be changed unless a next bus reset occurs. For this reason, the node which could not acquire the transfer band that was originally required must wait for the next bus reset before acquiring the transfer band. As a result, there was a problem in that the communication efficiency deteriorates.

In addition, in order to prevent the nodes that are connected to the same bus system from becoming unable to acquire the respective transfer bands, the system configuration is generally designed in advance so that the number of nodes that are connected to the same bus system and the number of transfer bands used are limited. For this reason, there was a problem in that it is difficult to improve the extendibility of the nodes to be connected to the same bus system, such as adding the nodes having various kinds of performances.

SUMMARY OF THE INVENTION

Accordingly, it is a general object of the present invention to provide a novel and useful band allocation method, communication control unit and communication apparatus, in which the problems described above are suppressed.

Another and more specific object of the present invention is to provide a band allocation method, a communication control unit and a communication apparatus, which can improve both the communication efficiency and the extendibility of the nodes to be connected to the same bus system.

Still another object of the present invention is to provide a band allocation method adapted to a communication system in which a plurality of nodes and a managing apparatus are coupled via a network and each node requests a transfer band with respect to the managing apparatus, comprising the steps of (a) sending tolerable values of a transfer rate and a compression rate from each node to the managing apparatus at a time of a resetting; (b) sending a transfer rate and a compression rate that are to be actually used from each node to the managing apparatus when making a request for a transfer band after the resetting; (c) detecting a node that cannot secure the transfer band and calculating a lacking bandwidth, in the managing apparatus, with respect to the request for the transfer band; (d) detecting a node that can reduce a transfer band thereof and specifying a transfer rate and a compression rate with respect to the node that can reduce the transfer band thereof, in the managing apparatus, based on the tolerable values of the transfer rate and the compression rate of each node and the transfer rate and the compression rate included in the request for the transfer band; and (e) specifying the transfer band, the transfer rate and the compression rate as requested by the request for the transfer band, in the managing apparatus, with respect to the node that cannot secure the transfer band. According to the band allocation method of the present invention, it is possible to improve both the communication efficiency and the extendibility of the nodes to be connected to the same bus system.

A further object of the present invention is to provide a communication control unit for a node which requests a transfer band with respect to a managing apparatus that is coupled to the node via a network, comprising a part configured to send tolerable values of a transfer rate and a compression rate to the managing apparatus at a time of a resetting; a part configured to send a transfer rate and a compression rate that are to be actually used to the managing apparatus, when making a request for the transfer band after the resetting; and a part configured to set the transfer band, the transfer rate and the compression rate to a transfer band, a transfer rate and a compression rate that are specified from the managing apparatus. According to the communication control unit of the present invention, it is possible to improve both the communication efficiency and the extendibility of the nodes to be connected to the same bus system.

Another object of the present invention is to provide a communication apparatus comprising a communication control unit for a node which requests a transfer band with respect to a managing apparatus that is coupled to the node via a network, the communication control unit comprising a part configured to send tolerable values of a transfer rate and a compression rate to the managing apparatus at a time of a resetting; a part configured to send a transfer rate and a compression rate that are to be actually used to the managing apparatus, when making a request for the transfer band after the resetting; and a part configured to set the transfer band, the transfer rate and the compression rate to a transfer band, a transfer rate and a compression rate that are specified from the managing apparatus; and a host unit, coupled to the communication control unit, and installed with a software configured to control sending of an asynchronous packet that declares the transfer rate and the compression rate that are to be actually used when making the request for the transfer band after the resetting. According to the communication apparatus of the present invention, it is possible to improve both the communication efficiency and the extendibility of the nodes to be connected to the same bus system.

Still another object of the present invention is to provide a communication control unit for a managing apparatus which receives a request for a transfer band from a plurality of nodes that are coupled to the managing apparatus via a network, comprising a part configured to store tolerable values of a transfer rate and a compression rate received from each node at a time of a resetting; a part configured to receive a transfer rate and a compression rate that are to be actually used from each node, after the resetting; a part configured to detect a node that cannot secure a transfer band and to calculate a lacking bandwidth, with respect to a request for the transfer band; a part configured to detecting a node that can reduce a transfer band thereof and to specify a transfer rate and a compression rate with respect to the node that can reduce the transfer band thereof, based on the tolerable values of the transfer rate and the compression rate of each node and the transfer rate and the compression rate included in the request for the transfer band; and a part configured to specify the transfer band, the transfer rate and the compression rate as requested by the request for the transfer band, with respect to the node that cannot secure the transfer band. According to the communication control unit of the present invention, it is possible to improve both the communication efficiency and the extendibility of the nodes to be connected to the same bus system.

A further object of the present invention is to provide a communication apparatus comprising a communication control unit for a managing apparatus which receives a request for a transfer band from a plurality of nodes that are coupled to the managing apparatus via a network, the communication control unit comprising a part configured to store tolerable values of a transfer rate and a compression rate received from each node at a time of a resetting; a part configured to receive a transfer rate and a compression rate that are to be actually used from each node, after the resetting; a part configured to detect a node that cannot secure a transfer band and to calculate a lacking bandwidth, with respect to a request for the transfer band; a part configured to detecting a node that can reduce a transfer band thereof and to specify a transfer rate and a compression rate with respect to the node that can reduce the transfer band thereof, based on the tolerable values of the transfer rate and the compression rate of each node and the transfer rate and the compression rate included in the request for the transfer band; and a part configured to specify the transfer band, the transfer rate and the compression rate as requested by the request for the transfer band, with respect to the node that cannot secure the transfer band; and a host unit, coupled to the communication control unit, and installed with a software configured to control specifying a transfer rate and a compression rate with respect to the node that can reduce the transfer band thereof, and specifying a transfer band, a transfer rate and a compression rate with respect to the node that cannot secure the transfer band with respect to the request for the transfer band. According to the communication apparatus of the present invention, it is possible to improve both the communication efficiency and the extendibility of the nodes to be connected to the same bus system.

Other objects and further features of the present invention will be apparent from the following detailed description when read in conjunction with the accompanying drawings.

BRIEF DESCRIPTION OF THE DRAWINGS

FIG. 2 is a diagram showing a Self-ID packet as prescribed by the IEEE1394 communication standard;

FIG. 3 is a diagram for explaining information held in a BANDWIDTH_AVAILABLE register;

FIG. 5 is a diagram for explaining parameters of the bandwidth requirement;

FIG. 6 is a flow chart for explaining a band reallocation sequence; and

FIG. 7 is a diagram for explaining a transfer sequence after band reallocation.

DESCRIPTION OF THE PREFERRED EMBODIMENTS

Figure 1:
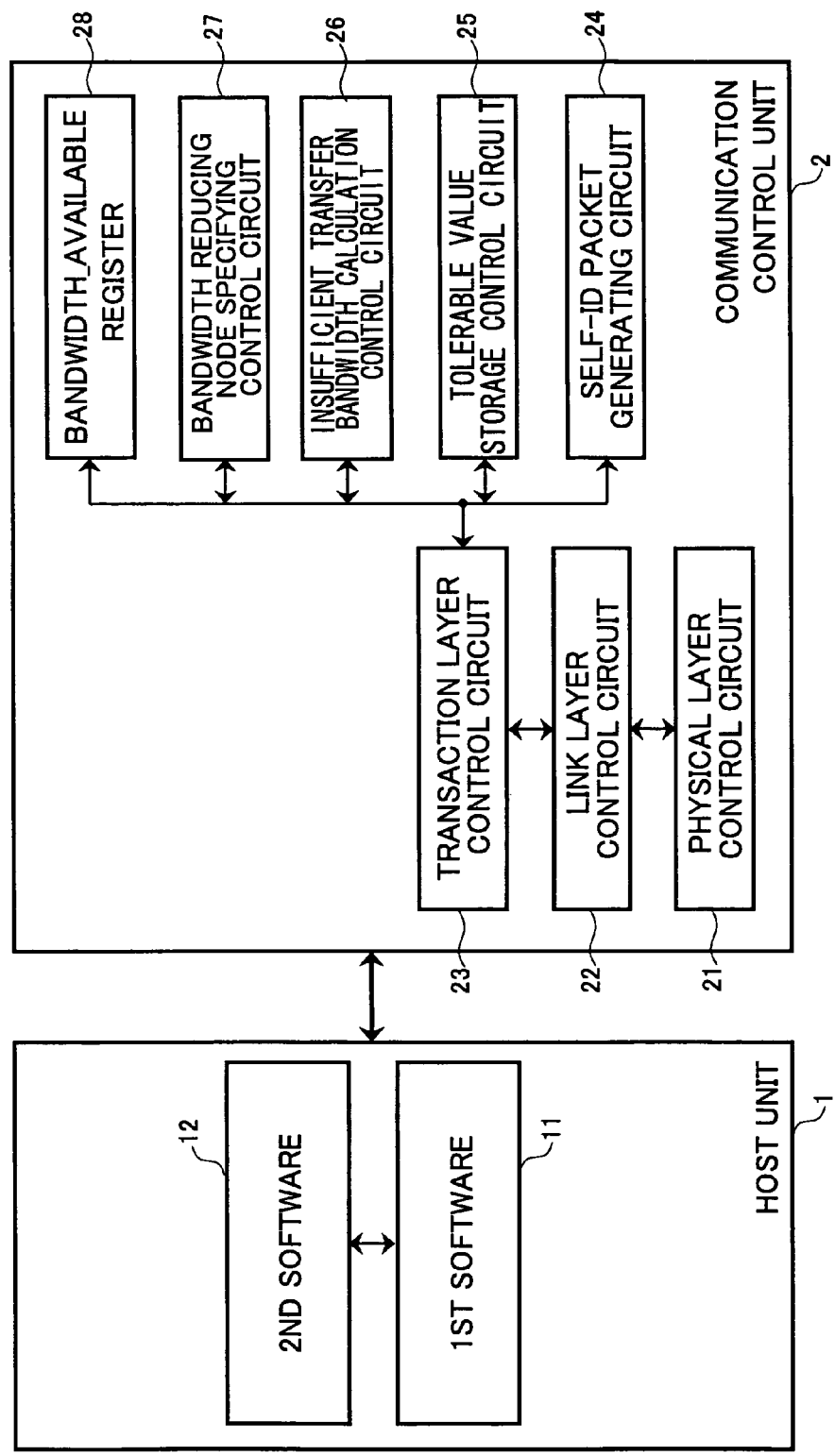
FIG. 1 is a system block diagram showing an embodiment of the communication apparatus according to the present invention.

A description will be given of embodiments of the band allocation method, the communication control unit and the communication apparatus according to the present invention, by referring to the drawings.

FIG. 1 is a system block diagram showing an embodiment of the communication apparatus according to the present invention. This embodiment of the communication apparatus employs an embodiment of the band allocation method according to the present invention and an embodiment of the communication control unit according to the present invention. This embodiment is applied to a communication system in which a plurality of communication apparatuses in conformance with the IEEE1394 communication standard, that is, a plurality of nodes, are connected via a network, and one of the nodes is fixedly used as an Isochronous Resource Manager (IRM). The node that is to be used as the IRM may be determined by a known method in conformance with the IEEE1394 communication standard, and a description thereof will be omitted in this specification.

The node in conformance with the IEEE1394 communication standard, shown in FIG. 1, is made up of a host unit 1 and a communication control unit 2. This node may also operate as the IRM. In this embodiment, the communication control unit 2 is formed by a single semiconductor integrated circuit device (or semiconductor chip), but the communication control unit 2 is of course not limited to such.

The host unit 1 is formed by a general purpose computer such as a personal computer. The host unit 1 is installed with a first software 11 for sending an asynchronous packet that declares the transfer rate and the compression rate of the communication apparatus when the communication apparatus operates as the node, and a second software 12 for sending an asynchronous packet that declares the transfer rate and the compression rate of the communication apparatus when the communication apparatus operates as the IRM. When acquiring the transfer band, the first software 11 executes a sequence for also sending an asynchronous packet for notifying the transfer rate and the compression rate to be actually used for the transfer. The second software 12 executes a band reallocation sequence for sending an asynchronous packet for notifying the transfer rate and the compression rate with respect to the node that can reduce the transfer band thereof, and for sending an asynchronous packet for notifying the transfer band, the transfer rate and the compression rate as requested with respect to the node which could not acquire the transfer band as requested.

The communication control unit 2 includes a physical layer control circuit 21, a link layer control circuit 22, a transaction layer control circuit 23, a Self-ID packet generating circuit 24, a tolerable value storage control circuit 25, a insufficient transfer bandwidth calculation control circuit 26, a bandwidth reducing node specifying control circuit 27, and a BANDWIDTH_AVAILABLE register 28. The physical layer control circuit 21 is formed by a control circuit part for the physical layer in conformance with the IEEE1394 communication standard. The link layer control circuit 22 manages the generation and transfer of a standard packet in conformance with the IEEE1394 communication standard. The transaction layer control circuit 23 controls the protocol of the IEEE1394 bus by various kinds of transactions.

The Self-ID packet generating circuit 24 allocates a tolerable value of the compression rate in a reserve region of the Self-ID packet as prescribed by the IEEE1394 communication standard, and sets the transfer rate and the tolerable value of the compression rate when transferring the Self-ID packet during a bus reset sequence.

FIG. 2 is a diagram showing the Self-ID packet as prescribed by the IEEE1394 communication standard. Since the Self-ID packet itself is known, a description will be given only with respect to portions directly related to the subject matter of the present invention. In FIG. 2, a 2-bit sp (Phy_SPEED) field indicates the tolerable value of the transfer rate, and indicates S100 (100 Mbps) when "00", indicates S100 and S200 (200 Mbps) when "01", indicates S100, S200 and S300 (300 Mbps) when "10", and indicates reserved when "11". A 2-bit rsv field indicates a reserved field (or region) according to the IEEE1394 communication standard, but in this embodiment, indicates the tolerable value of the compression rate. This 2-bit rsv field indicates $1/1$ (no compression) when "00", indicates $1/2$ when "01", indicates $1/4$ when "10", and indicates reserved when "11".

The tolerable value storage control circuit 25 extracts from the Self-ID packet the transfer rate and the compression rate tolerated by each node, and stores the extracted transfer rate and compression rate. The insufficient transfer bandwidth calculation control circuit 26 detects the node that could not secure the transfer band, and calculates the insufficient bandwidth. The bandwidth reducing node specifying control circuit 27 compares the transfer rate and the compression rate tolerated by each node (tolerable value of the transfer rate and the tolerable value of the compression rate) with the transfer rate and the compression rate that are notified when the transfer band is requested, and specifies the transfer rate and the compression rate with respect to the node that can reduce the transfer bandwidth thereof. The BANDWIDTH_AVAILABLE register 28 holds and displays a bandwidth BANDWIDTH_AVAILABLE that is presently available (that is, presently usable).

FIG. 3 is a diagram for explaining information held in the BANDWIDTH_AVAILABLE register 28. As shown in FIG. 3, the BANDWIDTH_AVAILABLE register 28 includes a 19-bit reserved region and a 13-bit bandwidth remaining (bw_remaining) region when holding the definition. The BANDWIDTH_AVAILABLE register 28 includes the 19-bit reserved region that is "0" (zeros) and the bandwidth remaining (bw_remaining) region that is "4915" when holding the initial values. The BANDWIDTH_AVAILABLE register 28 includes the 19-bit reserved region that is "0" (zeros) and the bandwidth remaining (bw_remaining) region that indicates the bandwidth remaining at the time of the "last successful lock" when holding the read values. The BANDWIDTH_AVAILABLE register 28 includes the 19-bit reserved region that is "ignored" and the bandwidth remaining (bw_remaining) region that is "conditionally written" when holding the lock effects.

Figure 4:
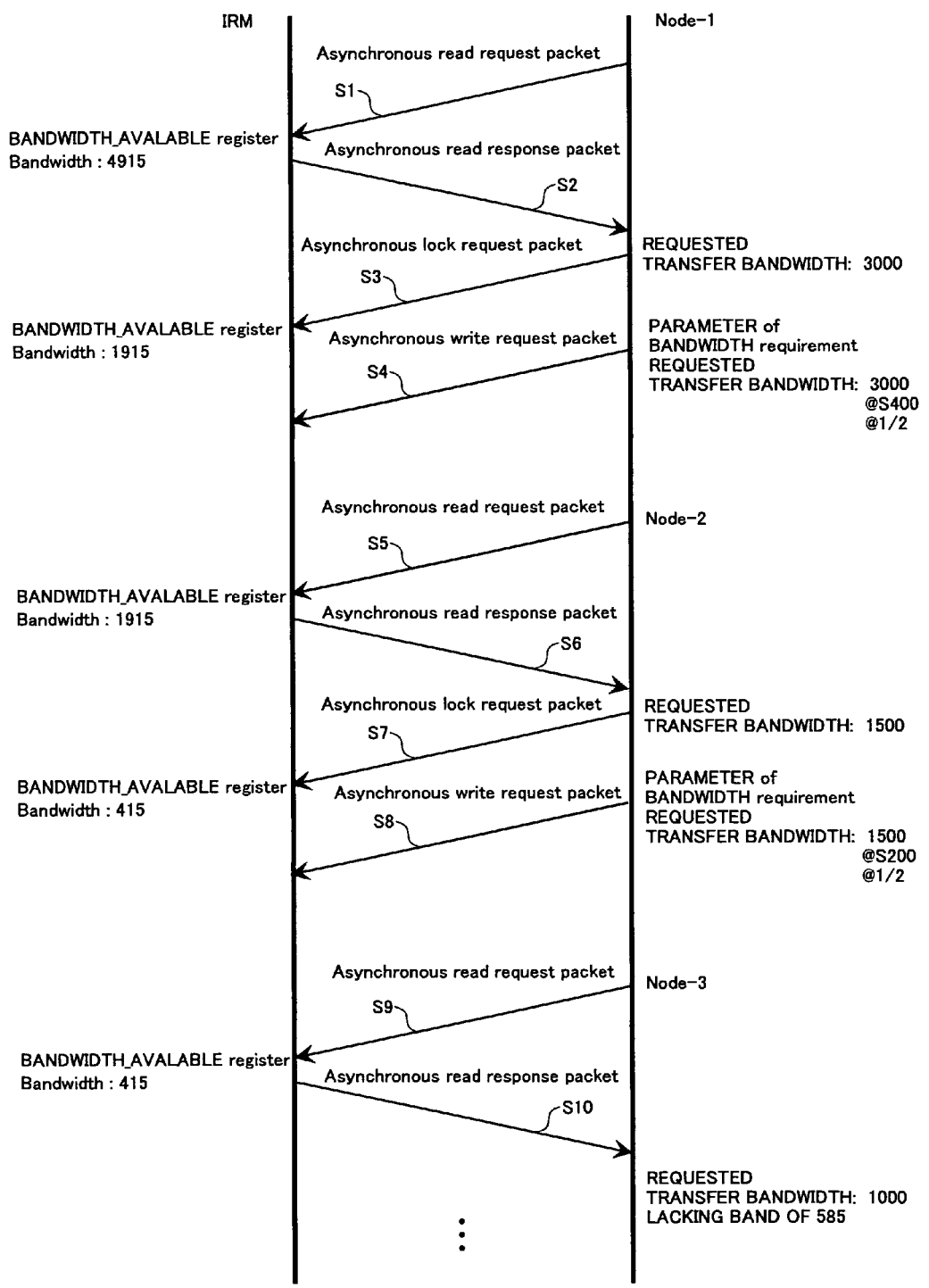
FIG. 4 is a diagram for explaining a transfer sequence of a bandwidth requirement of the embodiment.

FIG. 4 is a diagram for explaining a transfer sequence of a bandwidth requirement of this embodiment. It is assumed for the sake of convenience that information is exchanged among nodes Node-1, Node-2 and Node-3 having the structure shown in FIG. 1 and a node IRM which operates as the IRM and has the structure shown in FIG. 1 that are connected via a network. Furthermore, it is also assumed for the sake of convenience that the tolerable value of the transfer rate is S100, S200 and S400 and the tolerable value of the compression rate is $1/1$, $1/2$ and $1/4$ for the node Node-1, the tolerable value of the transfer rate is S100, S200 and S400 and the tolerable value of the compression rate is $1/1$ and $1/2$ for the node Node-2, and the tolerable value of the transfer rate is S100, S200 and S400 and the tolerable value of the compression rate is $1/1$ for the node Node-3. The tolerable values of the transfer rate and the tolerable values of the compression rate for the nodes Node-1 through Node-3 are stored within the tolerable value storage control circuit 25. The operation of each of the nodes Node-1 through Node-3 is carried out under the control of the first software 11, and the operation of the IRM is carried out under the control of the second software 12.

As described above, the Self-ID packet generating circuit 24 of each of the nodes Node-1 through Node-3 allocates the tolerable value of the compression rate to the reserve field of the Self-ID packet prescribed by the IEEE1394 communication standard, and sets the tolerable value of the transfer rate and the tolerable value of the compression rate when transferring the Self-ID packet during the bus reset sequence. The tolerable value storage control circuit 25 of the IRM extracts from the Self-ID packet the tolerable value of the transfer rate and the tolerable value of the compression rate of each of the nodes Node-1 through Node-3, and stores the extracted tolerable values. Accordingly, at a point in time when the process shown in FIG. 4 is carried out, the IRM recognizes the tolerable value of the transfer rate and the tolerable value of the compression rate of each of the nodes Node-1 through Node-3.

In a step S1 shown in FIG. 4, an asynchronous read request packet is sent from the node Node-1 to the IRM, and in a step S2, an asynchronous read response packet including an initial bandwidth "4915" Mbs stored in the BANDWIDTH_AVAILABLE register 28 is sent from the IRM to the node Node-1. In a step S3, an asynchronous lock request packet including a requested transfer band "3000", for example, is sent from the node Node-1 to the IRM, and the bandwidth remaining within the BANDWIDTH_AVAILABLE register 28 of the IRM becomes "1915". In a step S4, an asynchronous write request packet including a transfer rate "S400" and a compression rate "$1/4$" that are to be actually used, as parameters of the bandwidth requirement for "3000", is sent from the node Node-1 to the IRM. The steps S1 through S4 are carried out under the control of the control circuits 21 through 23, and the step S4 acquires the parameters of the bandwidth requirement from the tolerable value storage control circuit 25.

FIG. 5 is a diagram for explaining the parameters of the bandwidth requirement. As shown in FIG. 5, the parameters of the bandwidth requirement are formed by a 15-bit reserved field (or region), a 2-bit sp (use_Speed) field, a 2-bit cr (use_Compression rate) field, and a 13-bit bandwidth (Bandwidth) field. The sp (use_Speed) field indicates the transfer rate that is to be actually used, and indicates S100 (100 Mbps) when "00", indicates S100 and S200 (200 Mbps) when "01", indicates S100, S200 and S300 (300 Mbps) when "10", and indicates reserved when "11". In addition, the cr (use_Compression rate) field indicates the compression rate that is to be actually used, and indicates $1/1$ (no compression) when "00", indicates $1/2$ when "01", indicates $1/4$ when "10", and indicates reserved when "11". The bandwidth (Bandwidth) field indicates the bandwidth that is to be actually used.

In a step S5 shown in FIG. 4, an asynchronous read request packet is sent from the node Node-2 to the IRM, and in a step S6, an asynchronous read response packet including a bandwidth remaining "1915" stored in the BANDWIDTH_AVAILABLE register 28 is sent from the IRM to the node Node-2. In a step S7, an asynchronous lock request packet including a requested transfer band "1500", for example, is sent from the node Node-2 to the IRM, and the bandwidth remaining within the BANDWIDTH_AVAILABLE register 28 of the IRM becomes "415". In a step S8, an asynchronous write request packet including a transfer rate "S200" and a compression rate "½" that are to be actually used, as parameters of the bandwidth requirement for "1500", is sent from the node Node-2 to the IRM. The steps S5 through S8 are carried out under the control of the control circuits 21 through 23, and the step S8 acquires the parameters of the bandwidth requirement from the tolerable value storage control circuit 25.

In a step S9, an asynchronous read request packet is sent from the node Node-3 to the IRM, and in a step S10, an asynchronous read response packet including a bandwidth remaining "415" stored in the BANDWIDTH_AVAILABLE register 28 is sent from the IRM to the node Node-3. In this case, an asynchronous lock request packet including a requested transfer band "1000", for example, is sent from the node Node-3 to the IRM, and since the bandwidth remaining within the BANDWIDTH_AVAILABLE register 28 of the IRM is "415", and the bandwidth lacks by "585". The steps S9 and S10 are carried out under the control of the control circuits 21 through 23.

FIG. 6 is a flow chart for explaining a band reallocation sequence. In the process shown in FIG. 6, when a state where the bandwidth is insufficient as in the case of the step S10 shown in FIG. 4 occurs, the transfer insufficient bandwidth calculation control circuit 26 of the IRM detects the node which could not secure the transfer band, and calculates the insufficient (or lacking) bandwidth, in a step S31. In a step S32, the bandwidth reducing node specifying control circuit 27 of the IRM judges whether or not there exists a node that can reduce the transfer band thereof. No band reallocation is made when the judgement result in the step S32 is NO. In this case, the node Node-3 that cannot acquire the required transfer bandwidth waits for the next bus reset to be generated, similarly as in the conventional case.

However, if the judgement result in the step S32 is YES, the bandwidth reducing node specifying control circuit 27 of the IRM determines the node that can reduce the transfer band thereof the most and calculates the band that can be reduced, in a step S33. In addition, in a step S34, a judgement is made to determine whether or not the transfer band that can be reduced is greater than the insufficient (or lacking) bandwidth. No band reallocation is made if the judgement result in the step S34 is NO. On the other hand, if the judgement result in the step S34 is YES, the bandwidth reducing node specifying control circuit 27 makes a band reallocation in a step S35. The steps S31 through S35 are carried out under the control of the second software 12 of the IRM.

In this particular case, the node that can reduce the transfer band thereof the most is the node Node-1, and the transfer band (3000×¼=1500) that can be reduced is greater than the insufficient (or lacking) bandwidth (585). Hence, the band reallocation is made with respect to the node Node-1, so as to specify "1500" for the transfer band, "S400" for the transfer rate, and "¼" for the compression rate of the node Node-1. Because the insufficient (or lacking) bandwidth is secured by the band reallocation with respect to the node Node-1, no band reallocation with respect to the node Node-2 is required, but the reallocation with respect to the node Node-2 may be made similarly to the above if necessary. When making the band reallocation, it is preferable that the specified transfer rate is as high as possible, and that the specified compression rate is as low as possible. However, if the insufficient (or lacking) bandwidth can be secured by the band reallocation, the band reallocation may be made only with respect to one node or, made with respect to a plurality of nodes. The number of nodes that are the targets of the band reallocation may be set to an arbitrary value as long as it is within a range that would enable the insufficient (or lacking) bandwidth to be secured by the band reallocation.

FIG. 7 is a diagram for explaining a transfer sequence after the band reallocation described above. In a step S11, an asynchronous write request packet including the bandwidth requirement for "1500", the tolerable value "S400" of the transfer rate and the tolerable value "¼" of the compression rate, as the parameters of the bandwidth requirement specified by the bandwidth reducing node specifying control circuit 27 of the IRM, is sent from the IRM to the node Node-1. In a step S12, an asynchronous write request packet including the bandwidth requirement for "1500", the tolerable value "S200" of the transfer rate and the tolerable value "½" of the compression rate, as the parameters of the bandwidth requirement specified by the bandwidth reducing node specifying control circuit 27 of the IRM, is sent from the IRM to the node Node-2. In a step S13, an asynchronous write request packet including the bandwidth requirement for "1000", the tolerable value "S400" of the transfer rate and the tolerable value "¼" of the compression rate, as the parameters of the bandwidth requirement specified by the bandwidth reducing node specifying control circuit 27 of the IRM, is sent from the IRM to the node Node-3. The steps S11 through S13 are carried out under the control of the second software 12 of the IRM, via the control circuits 21 through 23.

Therefore, in this embodiment, the band allocation with respect to each of the nodes is carried out according to the following procedure.

(1) The tolerable value of the transfer rate and the tolerable value of the compression rate are allocated to the reserve field (or region) of the Self-ID packet, and during the bus reset sequence, each node generates and sends the Self-ID packet in which the tolerable value of the transfer rate and the tolerable value of the compression rate are set in the reserve field thereof.

(2) After the bus reset sequence, the node operating as the IRM extracts the tolerable value of the transfer rate and the tolerable value of the compression rate from the reserve field of the Self-ID packet received from another node, and stores the tolerable value of the transfer rate and the tolerable value of the compression rate that are extracted.

(3) When requesting the transfer band with respect to the IRM, each node sends an asynchronous packet including the transfer rate and the compression rate that are to be actually used for the transfer, as the parameters of bandwidth requirement.

(4) In the first band allocation, the IRM detects the node that could not sequence the transfer band and calculates the insufficient (or lacking) bandwidth.

(5) The IRM compares the tolerable value of the transfer rate and the tolerable value of the compression rate of each node with the transfer rate and the compression rate that are notified when the transfer band is requested; detects the node that can reduce the transfer band thereof based on a result of this comparison, and specifies the transfer rate and the compression rate of the node that can reduce the transfer band thereof.

(6) The IRM specifies, by an asynchronous packet, the transfer rate and the compression rate with respect to the node that can reduce the transfer band thereof, and specifies, by an asynchronous packet, the transfer band, the transfer rate and the compression rate as requested with respect to the node that could not acquire the transfer band as requested, so as to carry out a band reallocation.

By the procedure described above, it is possible to avoid as much as possible the generation of the node that cannot acquire the transfer band, without having to limit the number of nodes that can be connected to the bus system and the transfer bands used. Moreover, since it is unnecessary to limit, in advance, the number of nodes that can be connected to the bus system and the transfer bands used, the system design is facilitated. Furthermore, the transfer band can be reallocated without having to wait for the next bus reset, thereby improving the communication efficiency.

In the embodiment described above, the present invention is applied to a communication system in which a plurality of nodes in conformance with the IEEE1394 communication standard are connected via a network. However, the application of the present invention is not limited to such a communication system. The present invention is similarly applicable to any communication system in which a plurality of nodes and a managing apparatus are connected via a network and each node acquires a transfer band by requesting the transfer band with respect to the managing apparatus.

This application claims the benefit of a Japanese Patent Application No. 2006-031596 filed Feb. 8, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A band allocation method in a communication system in which a plurality of nodes and a managing apparatus are coupled via a network and each node requests a transfer band with respect to the managing apparatus, comprising:
sending tolerable values of a transfer rate and a compression rate from each node to the managing apparatus at a time of a resetting;
sending a transfer rate and a compression rate that are to be actually used from each node to the managing apparatus when making a request for a transfer band after the resetting;
detecting a node that cannot secure the transfer band and calculating a lacking bandwidth, by an insufficient transfer bandwidth calculation control circuit in the managing apparatus, with respect to the request for the transfer band;
detecting a node that can reduce a transfer band thereof and specifying a transfer rate and a compression rate with respect to the node that can reduce the transfer band thereof, by the insufficient transfer bandwidth calculation control circuit in the managing apparatus, based on the tolerable values of the transfer rate and the compression rate of each node and the transfer rate and the compression rate included in the request for the transfer band; and
specifying the transfer band, the transfer rate and the compression rate as requested by the request for the transfer band, by the insufficient transfer bandwidth calculation control circuit in the managing apparatus, with respect to the node that cannot secure the transfer band.

2. The band allocation method as claimed in claim 1, wherein:
the communication system is in conformance with the IEEE1394 communication standard;
the managing apparatus is formed by an Isochronous Resource Manager (IRM); and
the tolerable values of the transfer rate and the compression rate sent from each node to the IRM at the time of the resetting are set in a reserve (rsv) field of a Self-ID packet that is sent to the IRM.

3. The band allocation method as claimed in claim 2, wherein the transfer rate and the compression rate that are to be actually used, sent from each node to the IRM when making the request for the transfer band after the resetting, are set in parameters of bandwidth requirement included in an asynchronous packet that is sent to the IRM.

4. The band allocation method as claimed in claim 1, wherein) the detecting a node that can reduce a transfer band is carried out in the managing apparatus based on a comparison of the tolerable values of the transfer rate and the compression rate of each node with the transfer rate and the compression rate included in the request for the transfer band.

5. A communication control unit for a managing apparatus which receives a request for a transfer band from a plurality of nodes that are coupled to the managing apparatus via a network, comprising:
a part configured to store tolerable values of a transfer rate and a compression rate received from each node at a time of a resetting;
a part configured to receive a transfer rate and a compression rate that are to be actually used from each node, after the resetting;
a part configured to detect a node that cannot secure a transfer band and to calculate a lacking bandwidth, with respect to a request for the transfer band;
a part configured to detecting a node that can reduce a transfer band thereof and to specify a transfer rate and a compression rate with respect to the node that can reduce the transfer band thereof, based on the tolerable values of the transfer rate and the compression rate of each node and the transfer rate and the compression rate included in the request for the transfer band; and
a part configured to specify the transfer band, the transfer rate and the compression rate as requested by the request for the transfer band, with respect to the node that cannot secure the transfer band.

6. The communication control unit as claimed in claim 5, which is in conformance with the IEEE1394 communication standard, and wherein the tolerable values of the transfer rate and the compression rate received from each node at the time of the resetting are set in a reserve (rsv) field of a Self-ID packet that is sent to Isochronous Resource Manager (IRM).

7. The communication control unit as claimed in claim 6, wherein the transfer rate and the compression rate that are to be actually used, received from each node after the resetting, are set in parameters of bandwidth requirement included in an asynchronous packet that is received from each node.

8. A communication apparatus comprising:
a communication control unit for a managing apparatus which receives a request for a transfer band from a plurality of nodes that are coupled to the managing apparatus via a network, said communication control unit comprising:
a part configured to store tolerable values of a transfer rate and a compression rate received from each node at a time of a resetting;
a part configured to receive a transfer rate and a compression rate that are to be actually used from each node, after the resetting;
a part configured to detect a node that cannot secure a transfer band and to calculate a lacking bandwidth, with respect to a request for the transfer band;
a part configured to detecting a node that can reduce a transfer band thereof and to specify a transfer rate and a compression rate with respect to the node that can reduce the transfer band thereof, based on the tolerable values of the transfer rate and the compression rate of each node and the transfer rate and the compression rate included in the request for the transfer band; and a part configured to specify the transfer band, the transfer rate and the compression rate as requested by the request for the transfer band, with respect to the node that cannot secure the transfer band; and a host unit, coupled to the communication control unit, and installed with a software configured to control specifying a transfer rate and a compression rate with respect to the node that can reduce the transfer band thereof, and specifying a transfer band, a transfer rate and a compression rate with respect to the node that cannot secure the transfer band with respect to the request for the transfer band.

\* \* \* \* \*

UNITED STATES PATENT AND TRADEMARK OFFICE
CERTIFICATE OF CORRECTION

PATENT NO. : 7,746,898 B2
APPLICATION NO. : 11/444297
DATED : June 29, 2010
INVENTOR(S) : Suehiro Kawanishi It is certified that error appears in the above-identified patent and that said Letters Patent is hereby corrected as shown below:

Column 10, Line 10, in Claim 4, delete "wherein)" and insert --wherein--, therefor.

Signed and Sealed this
Twenty-eighth Day of December, 2010

David J. Kappos
*Director of the United States Patent and Trademark Office*